United States Patent
Finschi

(10) Patent No.: US 10,037,690 B2
(45) Date of Patent: Jul. 31, 2018

(54) METHOD AND SYSTEM FOR ACCESS CONTROL

(71) Applicant: Inventio AG, Hergiswil (CH)

(72) Inventor: Lukas Finschi, Ebicon (CH)

(73) Assignee: Inventio AG, Hergiswil NW (CH)

( * ) Notice: Subject to any disclaimer, the term of this patent is extended or adjusted under 35 U.S.C. 154(b) by 0 days.

(21) Appl. No.: 15/329,155

(22) PCT Filed: Jul. 23, 2015

(86) PCT No.: PCT/EP2015/066811
§ 371 (c)(1),
(2) Date: Jan. 25, 2017

(87) PCT Pub. No.: WO2016/016068
PCT Pub. Date: Feb. 4, 2016

(65) Prior Publication Data
US 2017/0213456 A1    Jul. 27, 2017

(30) Foreign Application Priority Data

Jul. 29, 2014  (EP) .................................... 14178929

(51) Int. Cl.
*G08G 1/07*   (2006.01)
*G08G 1/017*  (2006.01)
(Continued)

(52) U.S. Cl.
CPC ....... *G08G 1/0175* (2013.01); *G06K 7/10415* (2013.01); *G06K 7/1413* (2013.01);
(Continued)

(58) Field of Classification Search
CPC .................................. G06K 1/00; G06T 1/00
See application file for complete search history.

(56) References Cited

U.S. PATENT DOCUMENTS 6,340,935 B1    1/2002  Hall
2004/0233036 A1 11/2004 Sefton
(Continued)

FOREIGN PATENT DOCUMENTS

EP    1160734 A2   12/2001
EP    1643454 A2    4/2006
(Continued)

OTHER PUBLICATIONS

International Search Report and Written Opinion dated Nov. 10, 2015 in International Application No. PCT/EP2015/066811.

*Primary Examiner* — Shirley Lu
(74) *Attorney, Agent, or Firm* — Baker & Hostetler LLP

(57) ABSTRACT

An entrance control system for a car park, in which entry is regulated by a barrier, comprises an image processing device for determining a character string on a vehicle number plate and a reader for reading a credential. The credential is assigned to a user of the vehicle and has a feature identifying the user. A control unit of the entrance control system is coupled for communication purposes to the image processing device and the reader coupled. The control unit determines whether the feature identifying the user is present in a user database, and associates the determined character string with the feature identifying the user when the feature identifying the user is present in the user database, in order thus to register the number plate of the vehicle as belonging to the user.

18 Claims, 2 Drawing Sheets

(51) Int. Cl.
    *G08G 1/14* (2006.01)
    *G06K 9/46* (2006.01)
    *G06K 7/14* (2006.01)
    *G07B 15/04* (2006.01)
    *G06K 7/10* (2006.01)

(52) U.S. Cl.
    CPC ........... *G06K 9/4604* (2013.01); *G07B 15/04* (2013.01); *G08G 1/146* (2013.01); *G08G 1/149* (2013.01)

(56) References Cited

U.S. PATENT DOCUMENTS

2007/0069921 A1* 3/2007 Sefton ................. G08G 1/0175
                                                    340/932.2
2012/0143657 A1* 6/2012 Silberberg ......... G06Q 30/0207
                                                    705/14.1

FOREIGN PATENT DOCUMENTS

| EP | 2320385 A1 | 5/2011 |
| FR | 2871601 A1 | 12/2005 |
| KR | 100757012 | 9/2007 |
| WO | 03/036569 A1 | 5/2003 |

* cited by examiner

METHOD AND SYSTEM FOR ACCESS CONTROL

CROSS-REFERENCE TO RELATED APPLICATIONS

This application is the national phase application under 35 U.S.C. § 371 claiming the benefit of priority based on International Patent Application No. PCT/EP2015/066811, filed on Jul. 23, 2015, which claims the benefit of priority based on European Patent Application No. 14178929.7, filed on Jul. 29, 2014. The contents of each of these applications are herein incorporated by reference.

BACKGROUND

The technology described herein generally relates to entrance control methods and systems. The technology relates in particular to the use of such an entrance control method or system in connection with a car park. Various examples of embodiment of the technology relate in particular to a registration process when the car park is used for the first time and a system for such a registration method.

A car park can be a simple, for example fenced-in, outdoor parking area or a building structure, for example a public multi-storey car park or a parking structure as part of a commercial, office or residential building. Irrespective of the specific kind of car park, the entry and exit are usually controlled by bar-type barriers, gates or similar barriers. Registered users (e.g. employees of companies who work in surrounding commercial buildings or occupants of the residential building) and visitors (non-registered users) have access. In both cases, charges may be levied for the use of the car park.

Various solutions are known for providing these user groups with an efficient entry and exit from the car park. In a public multi-storey car park, for example, visitors take a car park ticket and pay a parking charge, which depends on the parking time. Registered users, on the other hand, can fix RFID tags to their vehicles according to a known solution, which are read by an RFID reading device positioned in the entrance area. If there is an access permit, a bar-type barrier for example is opened and the user can drive into the car park. Such an RFID-based system is known for example from U.S. Pat. No. 8,742,949 B2. The RFID (radio frequency identification) technology is generally known; it is based on reading out information stored on an IC chip by means of radio waves by a reading device. The IC chip is usually located on a carrier. The carrier with the IC chip is also known as an "electronic tag", "smart tag" or "electronic label".

Another solution is based on the recognition of a vehicle registration number. When a barrier or bar-type barrier is approached in the area of the entrance, a digital camera takes photographs of the front side or rear side of the vehicle and image processing software evaluates the photographs in order to recognise the registration number therefrom (i.e. the alphanumeric character string present thereon). If the recognised registration number is present in the database, i.e. the vehicle is registered, the system opens the bar-type barrier and enables entry into the car park. Such a system is known for example as a "LetUgo" system, which is available from Adaptive Recognition America, Florida, and is described in the product brochure "LetUgo—Automated Vehicle Access Control System, Based on Parkit Camera".

Methods for recognising the registration number of a vehicle are also the subject of scientific publications, see for example H. Kwasnicka et al., "License plate localization and recognition in camera pictures", AI-METH 2002—Artificial Intelligence Methods, November 13-15, Gliwice, Poland; and S. Saha et al., "License Plate Localization from Vehicle Images: An Edge Based Multi-stage Approach", International Journal of Recent Trends in Engineering, vol. 1, no. 1, May 2009, pages 284-288.

The known solutions are based on different approaches, wherein each system has advantages and disadvantages. A car park ticket can get lost, so that ultimately there is uncertainty about the actual parking time. The RFID-based system requires that the RFID tag is always carried along in the vehicle. If one day the driver uses another vehicle and forgets to take the RFID tag along with him in the other vehicle, the otherwise smooth entry is disrupted. Although the registration number-based system avoids the drawback of the RFID tag being taken along, this system requires a registration of the user. There is therefore the need for a technology which is more user-friendly and more flexible.

SUMMARY OF THE INVENTION

An aspect of such an improved technology relates to an entrance control method for a car park. The method ascertains a character string on a registration number of a vehicle using an image processing device and reads a credential using a reading device. The credential is assigned to a user of the vehicle and has a feature identifying the user. The method determines whether the feature identifying the user is present in a user database and links the ascertained character string with the feature identifying the user by using the user database if the feature identifying the user is present in the user database. The registration number of the vehicle is thus registered as belonging to the user.

A further aspect of the improved technology relates to an entrance control system for a car park, wherein entry is controlled by a barrier. The system comprises an image processing device for ascertaining a character string on a registration number of a vehicle and a reading device for reading a credential. The credential is assigned to a user of the vehicle and has a feature identifying the user. The system further comprises a control unit, which is coupled for communication purposes with the image processing device and the reading device. The control unit determines during the operation whether the feature identifying the user is present in the user database. The control unit links the ascertained character string with the feature identifying the user if the feature identifying the user is present in the user database, in order thus to register the registration number of the vehicle as belonging to the user.

This technology, either as a method or as a system, enables user-friendly and flexible parking of a vehicle. Different user groups can thus be taken into account in a flexible manner. For example, a regular user together with his vehicle can be automatically registered upon entry, without the vehicle having to be left to do so or without a registration form or suchlike having to be completed. When entering with this vehicle for the first time, the user for example presents his employee ID card, which shows him to be an access-entitled user, and a registration number recognition system ascertains ("reads") the registration number of the vehicle, after which the registration number is linked to the access-entitled user. Upon entry on the next occasion, the registration number is also ascertained and identified as "known"; the vehicle can then smoothly drive in.

If, for example, the user wishes to enter with another vehicle on another day, this registration process is repeated for this vehicle. A further data pair (user, registration number) is thus stored in the user database. The technology is thus flexible and adapts to the user behaviour of the user, for example when a user occasionally drives a second car or a motorbike.

The technology is however also flexible, inasmuch as it protects against possible misuse. It can for example be established for a user how many vehicles (e.g. registration numbers) can be registered for him. For a user living in an adjacent residential building, it can for example be established that only one vehicle may be registered. Similarly, the registration numbers of vehicles of a fleet belonging for example to a car hire company can be registered.

The clearance for entry can be designed flexibly. In an embodiment, clearance for entry into the car park is given if the feature identifying the user is present in the user database. This thus ensures that the entitled user can at least drive into the car park even when entering for the first time, irrespective of a registration. In another embodiment, clearance for entry into the car park is given if the ascertained character string is assigned to a registered user. This can be beneficial if a parking regulation stipulates that each vehicle of an entitled user must be registered.

Flexibility is also provided in that further criteria, for example eligibility criteria, can be established to control entry. The eligibility criteria include a parking permit assigned to the user, a maximum number of vehicles assigned to the user, a parking time assigned to the user and permitted types of vehicle. These eligibility criteria must be met before clearance for entry is given. If they are not met, entry remains blocked, even if for example the user is known.

The clearance for entry can take place by the opening of a barrier. Depending on the local circumstances, the barrier can be constituted in different ways, for example as a bar-type barrier, a bollard, a gate or similar barriers.

The credential can be constituted as an RFID card or as a carrier with a barcode. In the case of an RFID card, an identification number stored thereon is read out, which represents the feature identifying the user. If a carrier with a barcode is used, the information coded by the barcode is the feature identifying the user. The system can thus be adapted to credentials that may already be in use in the building.

The technology is preferably designed in such a way that entry into the car park remains blocked if neither the registration number nor the feature identifying the user is present in the user database. In such a case, the system then waits to see whether the user presses a visitor pushbutton. Only then is clearance for entry given.

BRIEF DESCRIPTION OF THE DRAWINGS

Various aspects of the improved technology are explained in greater detail below with the aid of examples of embodiment in connection with the figures. Identical elements have identical reference numbers in the figures. In the figures.

DETAILED DESCRIPTION OF THE INVENTION

Figure 1:
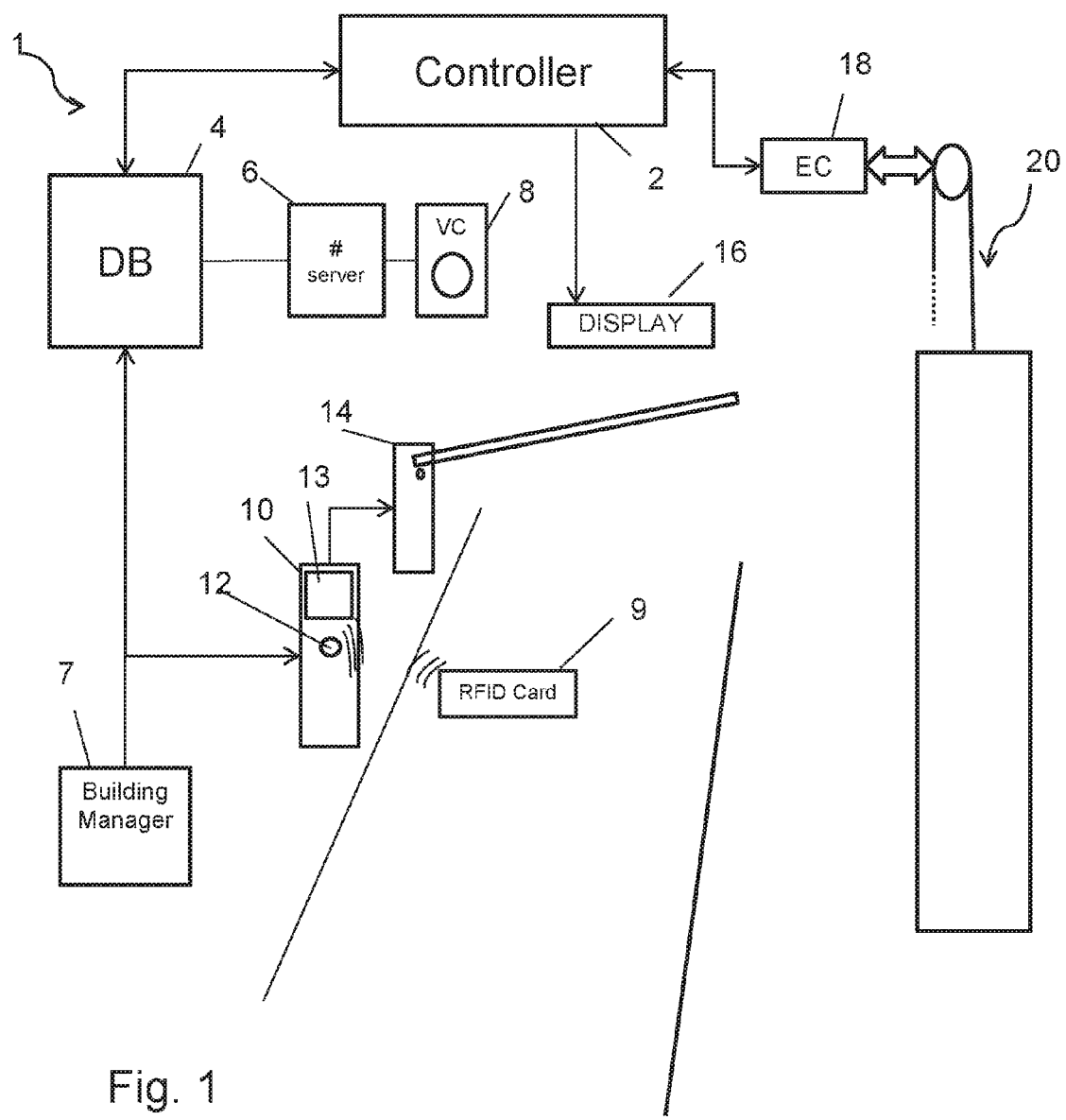
FIG. 1 shows a diagrammatic example of embodiment of a system for administrating a car park.

FIG. 1 shows a diagrammatic example of embodiment of a system 1 for the entry control of vehicles into a car park in connection with an optional lift system 20. The car park can be a simple, for example fenced-in, outdoor car park or a building structure, for example a public multi-storey car park or a parking structure as part of a commercial, office or residential building. A general overview of the general structure of system 1 is first given with the aid of FIG. 1, before the various functions of system 1 and various processes that are carried out in this system 1 are then described.

For reasons of a better overview, FIG. 1 shows only a region of an entrance into the car park. A bar-type barrier 14 as an example of a barrier, a terminal 10, a camera (in the following, a digital camera 8), the part of an image processing device for ascertaining a character string on a registration number of a vehicle, and a display device 16 are arranged in this region of the entrance. In the example of embodiment shown, terminal 10 comprises a reading device 12 and an operator panel 13. Reading device 12 in the shown example of embodiment is an RFID reader, which reads information from an RFID card (or an RFID tag) located within range. RFID card 9 comprises in a known manner a carrier, on which an IC chip and an RF antenna are located, wherein passive (without an energy storage unit (battery)) and active (with an energy storage unit) embodiments are known. Each RFID card 9 is assigned to a vehicle and/or a user seeking to enter the car park with a vehicle. For reasons of a better overview, FIG. 1 shows only an RFID card 9, without the assigned user or the vehicle.

Apart from these components of system 1 arranged in the entrance area, system 1 in the shown example of embodiment comprises further units, which are connected for communication purposes to these components. These units include a database computer 4 (DB), which contains a database (e.g. a user database), a number plate computer 6 (#server), a building management computer 7 and a higher-order control unit 2 (controller). Number plate computer 6 is part of the image processing device in one example of embodiment. Control unit 2 is connected to a display unit 16 and database computer 4. Database computer 4 is in turn connected to terminal 10, building management computer 7 and number plate computer 6. Number plate computer 6 is connected to digital camera 8, and terminal 10 is connected to bar-type barrier 14.

FIG. 1 shows the connections between the individual components of system 1 as individual point-to-point connections. The person skilled in the art recognises, however, that these connections can also be implemented in a different way, for example by means of a bus system (for example Ethernet, LON, BACNET), a radio system (for example ZigBee) or from a combination of bus system, radio system and individual point-to-point connections.

Digital camera 8 is arranged in such a way that a number plate (also referred to as a licence number) of a vehicle is in the field of vision of video camera 8. This is the case, for example, when digital camera 8 is arranged in front of or behind an incoming vehicle. Digital camera 8 can also be arranged obliquely relative to the entry direction of the vehicle. It is however also possible for a digital camera 8 to be arranged in front of the vehicle and a digital camera 8 behind the vehicle. The arrangement of digital camera 8 depends on the statutory regulations in force in a country concerning the fixing of the number plate. The optical properties (for example resolution (e.g. in megapixels), exposure and focal length) of digital camera 8 are selected or set in such a way that the digital image can be evaluated and the number plate can be recognised on the digital image in a quality that can be evaluated.

Moreover, it is understood that the lighting conditions in the entrance area are such that the number plate is sufficiently illuminated. A light source (for example an infrared light source) can also be present, which illuminates the side of the vehicle to be photographed. The digital image is present for example in JPEG format, although it can also be present in another format, for example in BMP or JPEG2000 format.

Digital camera 8 takes at least one photograph of the side of the vehicle. Number plate computer 6 receives the digital image or images from digital camera 8 and evaluates it/them with regard to the registration number. The evaluation takes place with image processing software; number plate computer 6 alone or in combination with digital camera 8 and/or database computer 4 thus represents, in one embodiment, the aforementioned image processing device in which the image processing software is installed. The aforementioned "LetUgo" system can for example be used as image processing software. The result of the evaluation by the image processing software is a character string (for example an alphanumeric character string), which represents the registration number of the vehicle and assigns it to this vehicle.

The image processing software can also be wholly or partly contained in digital camera 8; number plate computer 6 can thus also be dispensed with or formed into a unit with digital camera 8. The evaluation of the image processing software can thus take place completely or partially in digital camera 8, in which case digital camera 8 does not ascertain a digital image, but rather partially or completely evaluated information, e.g. the recognised registration number as a character string. This information is received by number plate computer 6 or also directly by database computer 4 from digital camera 8. Database computer 4 ascertains whether this character string (i.e. this registration number) is present in the database and assigned to a vehicle, for example on the basis of data which are stored in database computer 4. If this is the case, the vehicle is deemed to be "known".

The registration number evaluation by digital camera 8 and/or number plate computer 6 can evaluate further features of the vehicle, e.g. in order to check whether it is a vehicle, or a vehicle with a specific colour, of a specific size, a specific model etc. This can serve to identify false or non-genuine vehicles or registration numbers, or also to improve the quality or speed of detection of a registration number. For this purpose, information from the photograph taken by digital camera 8 in respect of shape, size or colour can for example be evaluated; in particular, information from a number of photographs can be evaluated (e.g. photographs from a plurality of cameras, and/or photographs taken at different times and/or photographs taken with different exposure). Furthermore, it is possible to evaluate additional sensors, e.g. induction, load or temperature sensors. The information can also be transmitted, together with or separate from the character string of the recognised registration number, to database computer 4, number plate computer 6, or to another computer, which for example can perform an evaluation or a comparison with reference data or with other detected data and can transmit information relating thereto back to digital camera 8 and/or number plate computer 6.

FIG. 1 shows digital camera 8 and number plate computer 6 as separate components. At least a part of the data, which are required to ascertain the registration number, can be stored in database computer 4 in an example of embodiment. The person skilled in the art recognises however that the functionality of a digital camera, a number plate computer and a database can be combined into an image processing device, as explained above. Thus, for example, the aforementioned firm Adaptive Recognition America offers an overall system ("LetUgo") for registration number ascertainment.

System 1 shown by way of example in FIG. 1 is also connected to lift installation 20. For this purpose, control unit 2 is connected to a lift control 18 of lift installation 20. Lift installation 20 is represented only by way of indication in FIG. 1; the person skilled in the art recognises however that lift installation 20 is merely representative of various embodiments (for example a single lift, a plurality of separate lifts in a building or in several adjacent buildings, a plurality of lifts combined to form a group or so-called double-decker lifts).

If lift installation 20 comprises a plurality of lifts, for example in an office building, it is advantageous according to an embodiment of the system to use a so-called destination call control for controlling the lifts. The principle of a destination call control is known, so that a detailed description at this point does not appear necessary. Lift installations with a destination call control are offered for example by the Schindler Group (e.g. also in combination with RFID reading devices for RFID cards carried by passengers). The RFID reading devices in combination with the RFID cards also enable an access control into the building or into a lift.

As mentioned, lift installation 20 is optional. If lift installation 20 is not present in an example of embodiment, and if no communication is therefore required with lift control 18, the functionality of control unit 2 can be integrated into another component of system 1, so that a separate control unit 2 is not present. Thus, for example, database computer 4 and/or building management computer 7, or their processors, can take over the functionality of control unit 2. In this case, these computers 4, 7 (or the processors) are programmed accordingly. As an alternative to this, further processors can be installed in computers 4, 7 or other components of system 1 (e.g. terminal 10 or licence number computer 6) and programmed accordingly.

Figure 2:
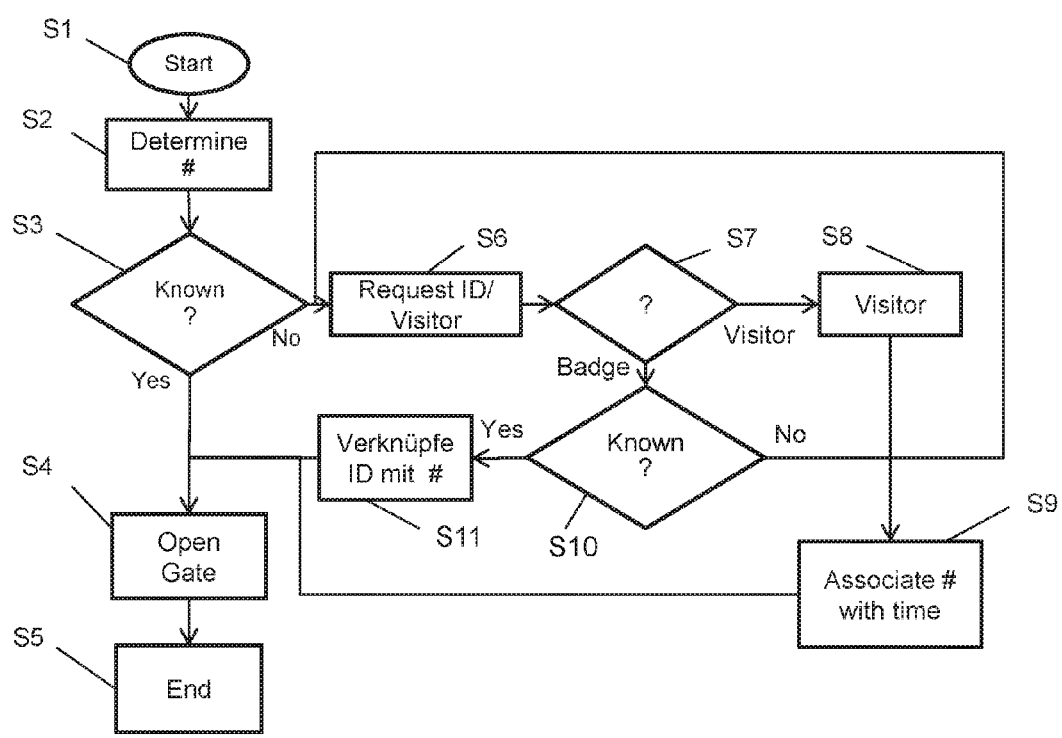
FIG. 2 shows an example of embodiment of a control method for a car park, in particular for access to such a car park.

With the understanding of the general structure of system 1, various functions are described in the following. FIG. 2 shows an example of embodiment of a control method for a car park, in particular for the access to such a car park. The persons who wish to drive with their vehicles into the car park may belong to a number of user groups: regular users, (irregular/sporadic) visitors and announced visitors. FIG. 2 shows, by way of example, a flow diagram of the control method for these user groups in various scenarios.

As a first scenario, the description of the method for a regular user is provided in combination with FIG. 1. A regular user may for example be a person who lives or works in the building or in an adjacent building and therefore regularly uses the car park as an access-entitled registered user. A charge may be payable for the use, which is levied monthly or annually. Even if it is a regular user, the user and/or the user's vehicle has to be initially registered in system 1, since they are not yet known in system 1. The method begins in step S1 and ends in step S5.

According to an example of embodiment, a regular user is driving his vehicle (passenger car or motorbike) for the first time into the entrance area of the car park. The user must stop at bar-type barrier 14, because bar-type barrier 14 is closed and remains closed despite being approached closer. In step S2, the control method ascertains the registration number of the vehicle. To do this, digital camera 8 takes a photograph (digital image) of the registration number or the side of the vehicle to which the registration number is fixed. Using image processing software (see above), number plate computer 6 determines a character string which represents the registration number.

In step S3, the control method, with the aid of database computer 4, checks whether this character string is present in the database. If this is not the case, the control method proceeds along the no-branch to step S6. In step S6 the user receives a request, via terminal 10 or display device 16, either to present a credential (for example a parking permit, a resident's permit, an employee ID (a badge or a key) or to press a visitor pushbutton. Since the example described here relates to a regular user, the user presents a credential, in particular a badge, and reading device 12 reads the information stored on the badge, for example an identification number (ID). The method then proceeds along the "badge branch" to step S10.

In an example of embodiment, a credential is constituted as an RFID card. The credential identifies the user as an access-authorised person, for example as a resident or employee. As an alternative to an RFID card, the credential can also be constituted as a card with a barcode. The person skilled in the art recognises that the credential does not have to be constituted as a card, but can also have another form factor. It is generally the case that the RFID functionality (e.g. implemented by antenna aerial and IC chip) and/or the barcode is applied on a carrier material suitable for a certain use. The credential can for example be constituted as a kind of key fob. The person skilled in the art also recognises that reading device 12 can be constituted correspondingly, for example as an RFID reading device or barcode reading device.

In step S10, the control method checks whether the read information is assigned to a known user. If the user is not known, the control method proceeds along the no-branch back to step S6. In an example of embodiment, further eligibility criteria can be established, for example with respect to a parking permit assigned to the user, a maximum number of vehicles assigned to the user, a parking time assigned to the user and permitted types of vehicle (e.g. only passenger cars, SUVs, motorbikes, but no lorries, caravans or delivery vans), maximum number of vehicles or time. Thus, the user might be known, but not be authorised to use the car park; in this case, too, the control method proceeds along the no-branch back to step S6. As a further alternative, the user might be known, but the vehicle might not be permitted to use the car park; in this case, too, the control method proceeds along the no-branch back to step S6. Further alternative criteria are for example the maximum number of different vehicles per user and the entitlement for entry on the basis of time, e.g. only during working hours. The user can be informed about this occurrence (e.g. "not valid", "no entry" or suchlike), either by a corresponding message on display device 16 or at terminal 10, for example on operator panel 13. The user then has the option of pressing the visitor pushbutton, in order to enter the car park subject to charge as a visitor (e.g. outside working hours), even though he is known in the system. If, on the other hand, the vehicle is not permitted to use the car park, the entrance remains blocked and the vehicle must leave the entrance. In the example of embodiment described here, however, it is assumed that the user is known and not a visitor. The control method therefore proceeds along the yes-branch to step S11.

In step S11, the method links the read information to the registration number ascertained in step S2. In the course of this linking, the registration number is stored as being assigned to the user, for example in the user database, and forms a data pair, which can optionally be supplemented with further information about the user and/or the vehicle. Further registration numbers can also be assigned to the user, either as a supplement to the existing data pair or as a new data pair. The vehicle of the regular user is thus registered in system 1. An advantage is that the registration takes place without the user having to leave the vehicle and/or having to complete registration forms. The control method then proceeds onward to a step S4.

In step S4, the control method opens bar-type barrier 14 and the user can drive his vehicle into the car park. Depending on the embodiment of the control method, the control method can open bar-type barrier 14 as soon as the user presents his badge, for example. Linking step S11 can therefore also be carried out in parallel with step S4, the opening of bar-type barrier 14. The control method described here ends in step S5.

When, on the next occasion, the regular user wishes to drive into the car park again, he can do this essentially in an uninterrupted manner, because in the ideal case (perhaps depending on the reaction time of system 1, in particular of bar-type barrier 14) the vehicle no longer has to stop. System 1 recognises in step S4 the registration number of the vehicle as known and opens bar-type barrier 14 in step S4. The user no longer has to hold his badge to reading device 12. In an example of embodiment, display device 16 can display a welcome message and/or parking or driving instructions.

In an example of embodiment, a periodic or irregular revalidation can be provided, i.e. from time to time the user must again show his credential, as described above in connection with step S6. This allows the building management, for example, to recognise vehicles without permanent right of use.

Exiting from the car park is also possible for the regular user without the vehicle having to stop at a bar-type barrier. In the area of the exit from the car park, a digital camera is also positioned which is connected to number plate computer 6. The ascertainment of the registration number takes place as described above by means of image processing. System 1 recognises the registration number of the vehicle as known and opens the bar-type barrier in the area of the exit.

As a second scenario, the description of the control method for a visitor is provided in connection with FIG. 2. A visitor may for example be a person who wishes to use the car park on one occasion or irregularly, in order to visit a person living in the vicinity or a firm located therein, or to deal with another matter. A charge may be payable for the use, which is levied depending on the parking time.

In step S3 of FIG. 2 (carried out as described above), the visitor's vehicle is as expected not recognised and has to stop at closed bar-type barrier 14. In step S6, the visitor is requested either to present a credential or to press the visitor pushbutton. In the scenario described here, the visitor presses the visitor pushbutton. When the visitor pushbutton is pressed, it is ascertained in step S7 that it is a visitor.

In a following step S9, the control method links the registration number of the vehicle to the time of entry into the car park. Depending on the embodiment of the control method, the control method can open bar-type barrier 14 (step S4) as soon as the visitor presses the visitor pushbutton. Linking step S9 can therefore also be carried out in parallel with step S4, the opening of bar-type barrier 14. The control method described here for a visitor also ends in step S5.

In an example of embodiment, terminal 10 issues a car park ticket, which the visitor takes with him and requires at the end of the stay to pay the parking charge. According to an embodiment, the arrival time is noted in a known manner on the car park ticket. In another example of embodiment, the issue of a car park ticket does not take place; the length of stay/parking time is instead ascertained on the basis of the registration number. At the end of the parking time, the visitor must hand over the registration number of his vehicle at the payment point (cash desk, reception), so that the parking charge can be ascertained. Once the parking charge is paid, clearance for the exit of this vehicle is given for a specific time (for example 15 or 20 minutes) after the payment.

In a further scenario, the visitor may be an announced visitor. In an embodiment, the visitor can report by himself and register the registration number or arranged to have it registered. The user can for example enter the registration number via a website or inform the administration of the car park or the building management by e-mail or by telephone. As an alternative to this, a host or a person receiving the visitor can register the registration number or arranged to have it registered with the administration or the building management. In this scenario, the visitor is thus known as "visitor" in system 1.

Related to FIG. 2, the control method ascertains in step S2 the registration number of the vehicle and recognises the registration number of the vehicle as known in step S3. The control method accordingly proceeds along the yes-branch to step S4 and opens bar-type barrier 14. The (registered) visitor can thus drive into the car park without having to stop at bar-type barrier 14, for example to take a car park ticket.

In an embodiment of system 1, there is a guidance system for visitors, authorised or not. For this purpose, control unit 2 and display device 16 are constituted in such a way that, when the visitor drives in, display device 16 displays a message or an instruction which tells the visitor to drive to the visitors' parking places. Additional devices (for example illuminated or colour-coded direction indicators, displays indicating the number of free parking places or similar devices) may be present, in order to guide the visitor to the visitors' parking places. In an embodiment, a visitor parking place can already be reserved for a visitor, for example close to a lift (lift installation 20), if it is a particularly privileged person (VIP) or a person with physical disabilities.

In an embodiment of system 1, the registration number is also recognised upon exiting. If the registration number is assigned to a regular user or a visitor who has paid the parking charge, the bar-type barrier opens at the exit and a display device, which is also arranged in the area of the exit, can wish the latter "have a good trip", for example. If, on the other hand, the bar-type barrier does not open, because for example the parking charge has not been paid, the display device can request the user to pay the parking charge or to contact the service personnel.

Building management computer 7 monitors the entry and exit of vehicles from the car park. Apart from the aforementioned functions such as for example checking whether the parking charge has been paid, various evaluations of the use of the car park can be carried out with the aid of building management computer 7. The use of the car park can for example be evaluated over time, according to user and/or vehicle, and/or according to type of user (e.g. regular user or visitor). Such evaluations enable the building management to optimise the management of the car park, for example with regard to opening times, the number or type of parking places, the pricing structure, the information to users, the charging procedure.

As indicated in FIG. 1, control device 2 can be connected to lift installation 20 in an embodiment. This can be advantageous especially for regular users (residents, employees), since the credential (badge) can be used both for the registration of the vehicle registration number and also for controlling lift installation 20. It is assumed here that lift installation 20 is provided with a destination call control. The administration of the credentials for these functionalities can then advantageously take place by means of database computer 4 and/or building management computer 7.

In this embodiment, lift installation 20 can be controlled as follows: The regular user, after the vehicle has been parked on a parking storey, calls a lift cage to the parking storey with the badge, in order to be transported to the destination storey in the building. Control device 2 then take steps such that the parking storey is then defined as a temporary destination storey for this user, which for example remains valid until such time as it is set back by the exiting of the vehicle.

If, at the end of the stay in the building, the user wishes to return to the parking storey and calls a lift cage to the present storey (entrance storey) using the badge, the destination call control selects in an example of embodiment the temporary destination storey as the destination storey. As an alternative to this, the destination call control can give the user the option of selecting the temporary destination storey (for example with the indication "parking place"). This may be useful if, during his stay, the user uses the lift to go from one storey to another storey. Such a control of the lift installation has the advantage for the user that the parking storey no longer needs to be remembered.

The preceding description was provided by reference to FIGS. 1 and 2, which show diagrammatically special embodiments of components and their connection with one another. Thus, for example, FIG. 1 shows bar-type barrier 14, which can be opened and closed. As an alternative to such a bar-type barrier 14, any other kind of barrier can be used that is suitable for blocking or providing clearance for entry into the car park. Thus, for example, a bollard can be installed in the entrance, which is raised and lowered and thus either blocks or provides clearance for entry. Further alternatives are vertically or horizontally moving gates.

The embodiments of the components and their connection with one another described by reference to FIGS. 1 and 2 are to be understood as examples. The person skilled in the art recognises that the various functionalities can be split up or combined in different ways. Thus, for example, a central computer unit can perform the functionality of number plate computer 6, database computer 4 and/or building management computer 7. The connections shown in FIG. 1 change correspondingly.

At least one of the control methods described here can be carried out by a computer or a computer-assisted device, which performs or brings about one or more method steps. The computer or the computer-assisted device contains read instructions for the performance of the method steps by one or more computer-readable storage media. These storage media can for example comprise volatile storage components (e.g. DRAM or SRAM), non-volatile storage components (e.g. hard discs, optical storage discs, flash RAM, or ROM), or a combination thereof.

The invention claimed is:

1. An access control method for registering a vehicle contemporaneously with entry of the vehicle into a car park comprising:
    using an image processing device to ascertain a character string corresponding to a displayed registration number of a vehicle entering into the car park;

reading a credential, using a reading device, wherein the credential is assigned to a user of the vehicle and includes an identifying feature of the user;

determining whether the user-identifying feature is present in a user database; and if the user-identifying feature is present in the user database, updating the user database to link the ascertained character string with the user-identifying feature, to thereby register the ascertained character string to indicate the vehicle as being associated with the user.

2. The method of claim 1, further comprising granting the vehicle clearance to enter the car park if the user-identifying feature is present in the user database.

3. The method of claim 2, wherein granting the vehicle clearance to enter comprises opening a barrier.

4. The method of claim 1, further comprising granting the vehicle clearance to enter the car park if the user-identifying feature is present in the user database and one or more eligibility criteria are met.

5. The method of claim 4, wherein the one or more eligibility criteria include at least one of a parking permit assigned to the user, a maximum number of vehicles assigned to the user, a parking time assigned to the user or permitted types of vehicle.

6. The method of claim 1, further comprising granting the vehicle clearance to enter the car park if the ascertained character string is assigned to a registered user.

7. The method of claim 1, wherein reading the credential comprises:

reading an identification number stored on an RFID card, wherein the identification number represents the user-identifying feature, or detecting a barcode present on a carrier, wherein information coded by the barcode represents the user-identifying feature.

8. The method of claim 1, further comprising denying entry into the car park if neither the displayed registration number nor the user-identifying feature is present in the user database.

9. The method of claim 1, further comprising denying entry into the car park if one or more established eligibility criteria are not met.

10. The method of claim 9, wherein the one or more established eligibility criteria include at least one of a parking permit assigned to the user, a maximum number of vehicles assigned to the user, a parking time assigned to the user or permitted types of vehicle.

11. The method of claim 1, further comprising:

reading, by a controlled lift installation, the credential and using the read credential to set a destination floor for the user;

determining a story in the car park associated with the user based on the read credential; and storing in the user database the user's car park story as a temporary destination location associated with the user.

12. The method of claim 11, further comprising:

at a subsequent time, reading the credential and if the temporary destination location associated with the user is present in the user database, transporting the user to the car park story associated with the temporary destination location; and resetting the temporary destination location associated with the user after the user's vehicle is detected as exiting the car park.

13. An access control system for registering a vehicle contemporaneously with entry of the vehicle into a car park with an entry-controlled barrier, the system comprising:

an image processing device configured to ascertain a character string corresponding to a displayed registration number of a vehicle entering into the car park;

a reading device configured to read a credential assigned to a user of the vehicle and including an identifying feature of the user; and a control unit communicatively coupled to the image processing device and the reading device, wherein the control unit is configured to determine whether the user-identifying feature is present in a user database, and, if the user-identifying feature is present in the user database, to update the user database to link the ascertained character string with the user-identifying feature, to thereby register the ascertained character string to indicate the vehicle as being associated with the user.

14. The system of claim 13, further comprising a terminal comprising the reading device and an operator panel.

15. The system of claim 13, wherein the image processing device comprises a digital camera, a number plate computer and the user database.

16. The system of claim 13, wherein the credential comprises:

an RFID card on which an identification number is stored, wherein the identification number represents the user-identifying feature, or a carrier with a barcode, wherein information coded by the barcode represents the user-identifying feature.

17. The system of claim 13, further comprising:

a controlled lift installation configured to read the credential and using the read credential to set a destination floor for the user;

the control unit further configured to determine a story in the car park associated with the user based on the read credential; and the control unit further configured to store in the user database the user's car park story as a temporary destination location associated with the user.

18. The system of claim 17, further comprising:

the controlled lift installation further configured to, at a subsequent time, read the credential and if the temporary destination location associated with the user is present in the user database, transporting the user to the car park story associated with the temporary destination location; and the control unit further configured to reset the temporary destination location associated with the user after the user's vehicle is detected as exiting the car park.

* * * * *